US008102933B2

(12) United States Patent
Nguyen et al.

(10) Patent No.: US 8,102,933 B2
(45) Date of Patent: Jan. 24, 2012

(54) TRANSMIT DIVERSITY SCHEME

(75) Inventors: Phong Nguyen, Glen Waverley (AU);
Jolyon White, Balwyn (AU)

(73) Assignee: NEC Corporation, Tokyo (JP)

( * ) Notice: Subject to any disclaimer, the term of this patent is extended or adjusted under 35 U.S.C. 154(b) by 769 days.

(21) Appl. No.: 11/993,555

(22) PCT Filed: Aug. 28, 2006

(86) PCT No.: PCT/JP2006/317389
§ 371 (c)(1),
(2), (4) Date: Apr. 23, 2008

(87) PCT Pub. No.: WO2007/024030
PCT Pub. Date: Mar. 1, 2007

(65) Prior Publication Data
US 2010/0074355 A1    Mar. 25, 2010

(30) Foreign Application Priority Data

Aug. 26, 2005 (AU) .................................. 2005904682
Aug. 25, 2006 (AU) .................................. 2006203698

(51) Int. Cl.
*H04B 7/02* (2006.01)
(52) U.S. Cl. ..................................................... 375/267
(58) Field of Classification Search .............. 375/260, 375/265, 267, 295, 299, 316; 370/208, 210, 370/334, 350
See application file for complete search history.

(56) References Cited

U.S. PATENT DOCUMENTS

| 7,002,900 | B2* | 2/2006 | Walton et al. | 370/208 |
| 7,508,880 | B2* | 3/2009 | Yun et al. | 375/267 |
| 7,577,085 | B1* | 8/2009 | Narasimhan | 370/206 |
| 7,593,472 | B2* | 9/2009 | Chen et al. | 375/260 |
| 7,616,704 | B2* | 11/2009 | Li et al. | 375/299 |
| 2001/0033622 | A1* | 10/2001 | Jongren et al. | 375/267 |
| 2004/0258174 | A1* | 12/2004 | Shao et al. | 375/267 |
| 2005/0254596 | A1* | 11/2005 | Naguib | 375/299 |
| 2005/0265280 | A1* | 12/2005 | Roh et al. | 370/328 |

FOREIGN PATENT DOCUMENTS

| CN | 1549471 A | 11/2004 |
| EP | 1 185 048 A2 | 3/2002 |
| WO | WO-2004/038987 A2 | 5/2004 |

OTHER PUBLICATIONS

Provisional U.S. Appl. No. 60/620,724, filed Oct. 22, 2004.*
Ouachani, I. et al.; "Trading Rate versus Diversity in Space-Time-Frequency Block Coding schemes"; Control, Communications and Signal Processing, 2004, First International Symposium on , 2004, pp. 171-174.

(Continued)

*Primary Examiner* — Khanh C Tran
(74) *Attorney, Agent, or Firm* — Dickstein Shapiro LLP

(57) ABSTRACT

The present invention relates to methods for implementing transmit diversity in a telecommunication network. In particular there is provided an algorithm for performing transmit diversity encoding in a transmitter (100) and transmit diversity decoding in a receiver (1700) respectively. In the method processed pairs of data blocks (314.1A, 314.1B) are transmitted on a first antenna (112.1) on N sub-carriers in a first temporal order; and a second antenna (112.2) in the reverse temporal order.

15 Claims, 20 Drawing Sheets

OTHER PUBLICATIONS

Savary, S., et al.; "A space-frequency-time diversity scheme for MIMO-OFDM system"; Electrical and Computer Engineering, 2005, Canadian Conference on May 4, 2005, pp. 1375-1379.

Lee, K.F. et al.; "A space-time coded transmitter diversity technique for frequency selective fading channels"; Sensor Array and Multichannel Signal Processing Workshop, 2000 Proceedings of the 2000 IEEE, Mar. 16, 2000, pp. 149-152.

Kenji, S., et al.; "Performance Evaluation of Space-Time-Frequency Block Codes over Frequency Selective Fading Channels"; Technical Report of IEICE. The Institute of Electronics, Information and COmmunication Engineers, Aug. 23, 2002, pp. 59-64, RCS2002-156.

Gong, Yi et al.; "Space-Frequency-Time Coded OFDM for Broadband Wireless Communications"; Globecom, Nov. 25-29, 2001, IEEE, New York, NY, USA, pp. 519-523.

Bauch, Gerhard; "Space-time Block Codes Versus Space-Frequency"; IEEE, The 57$^{th}$ IEEE Semiannual Vehicular Technolory Conference, New York, NY, USA, vol. 1, Apr. 22, 2003, pp. 567-571.

Rouquette-Léveil, Stéphanie, et al.; "Spatial Division Multiplexing of Space-time Block Codes"; Communication Technology Proceedings, Piscataway, NJ, USA., vol. 2, Apr. 9-11, 2003; pp. 1343-1347.

* cited by examiner

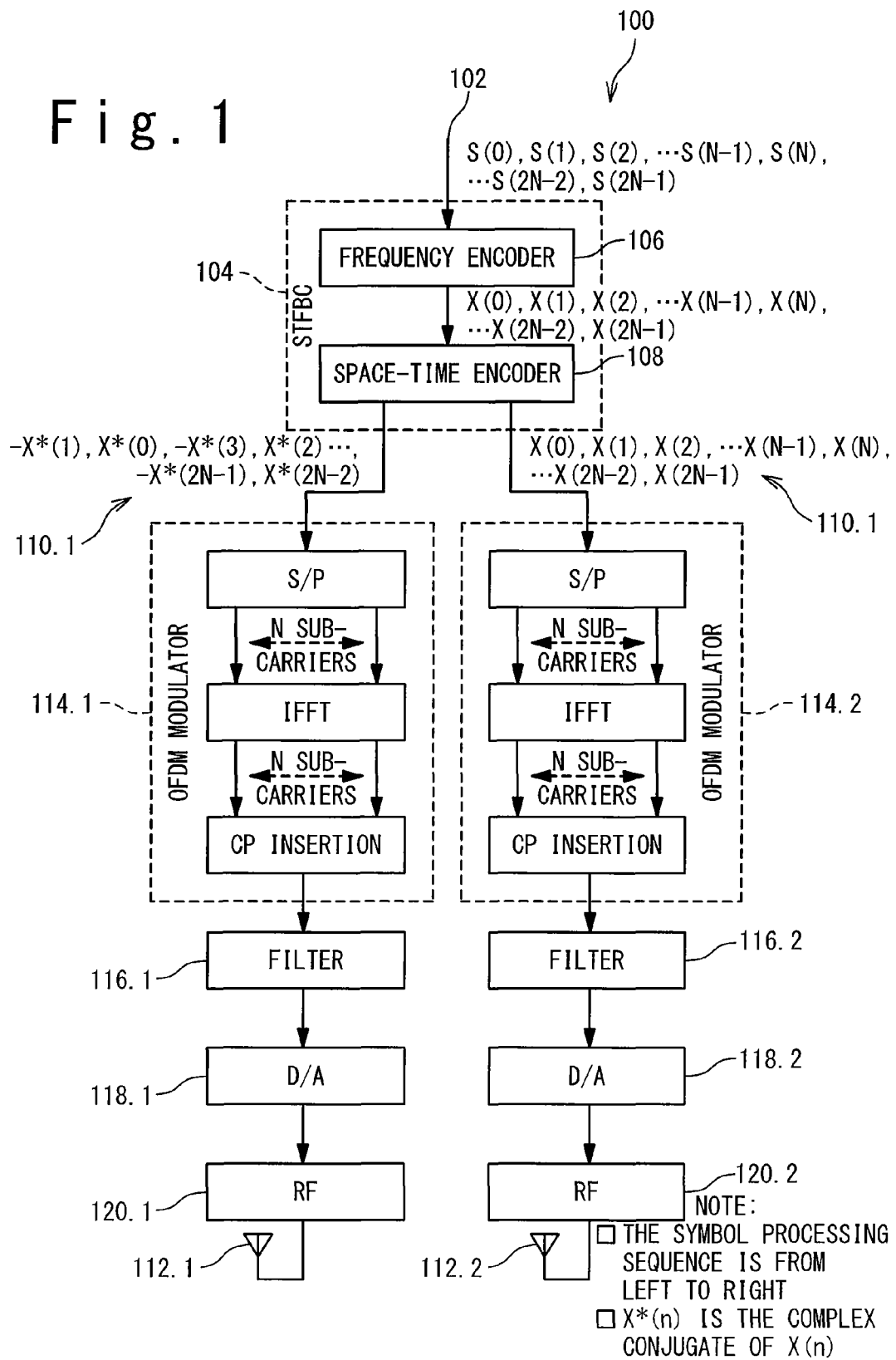

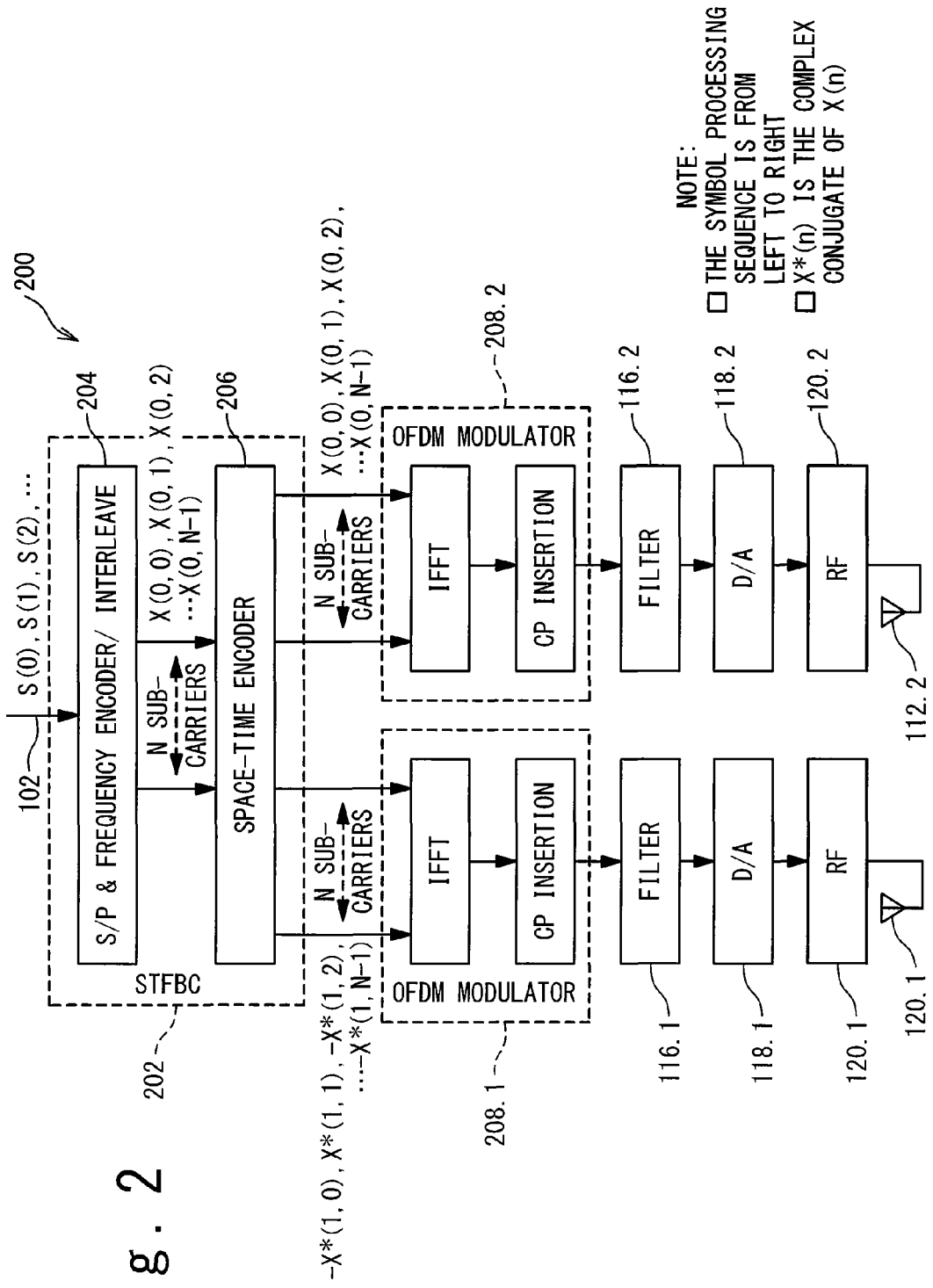

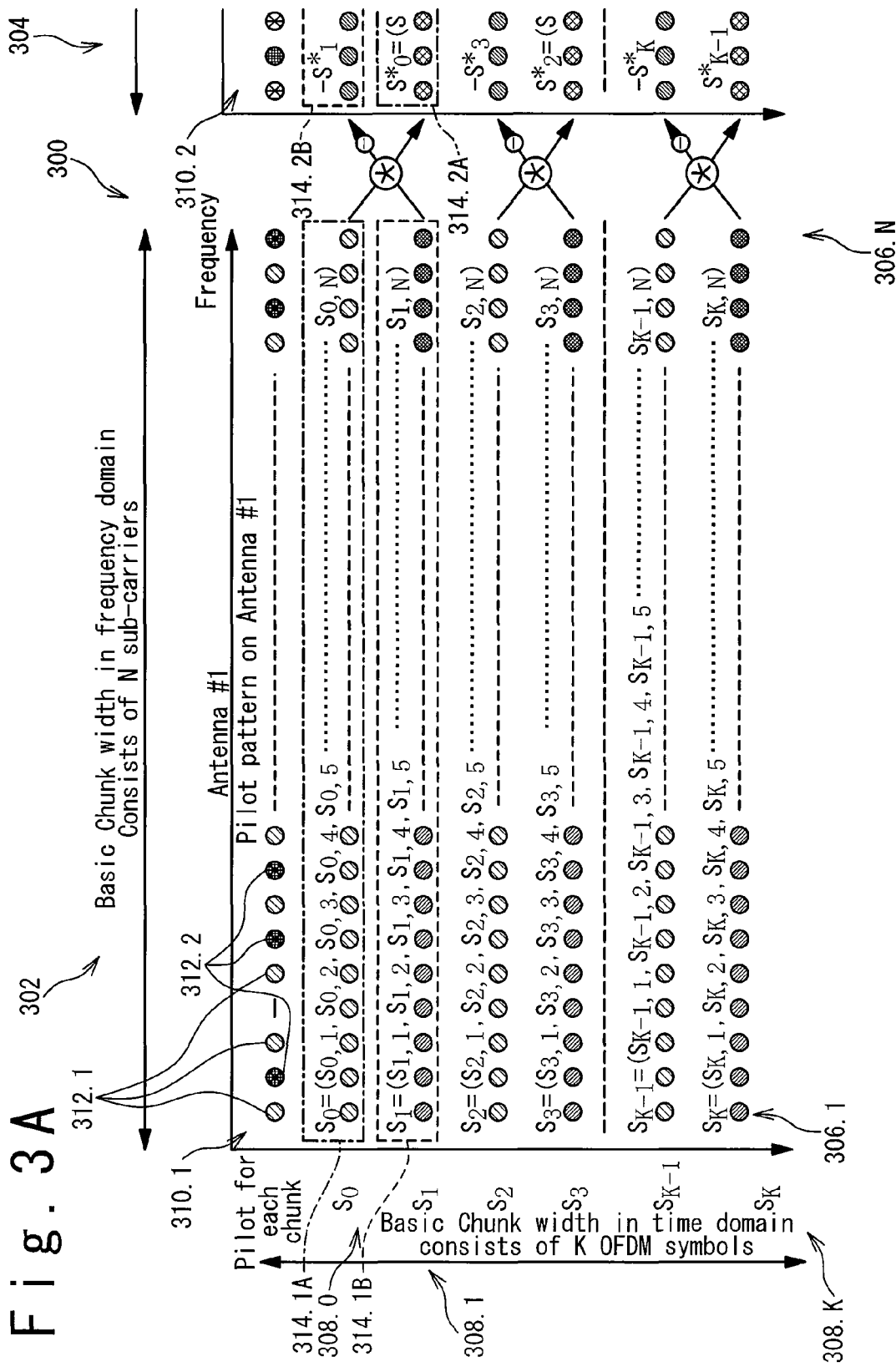

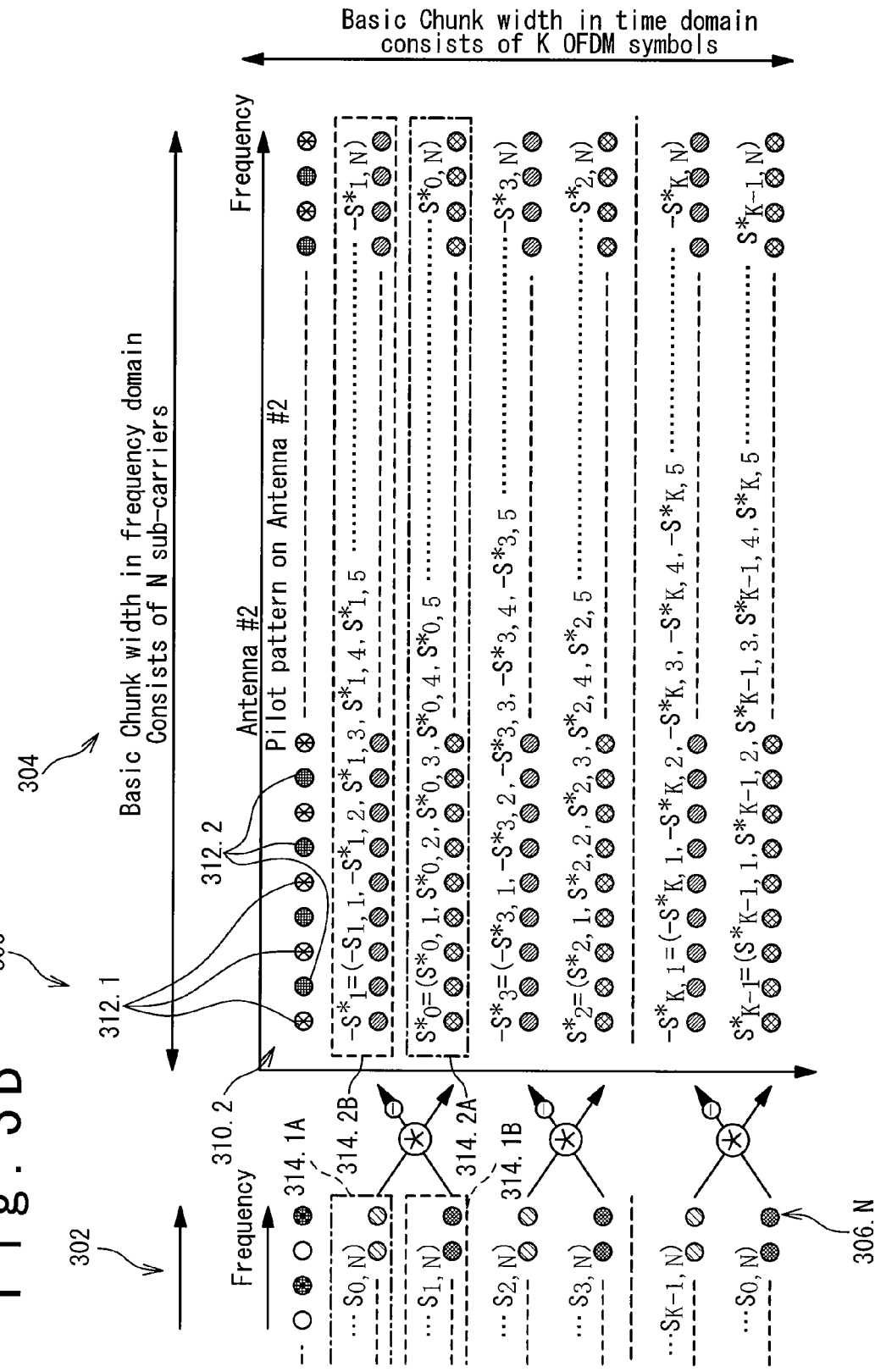

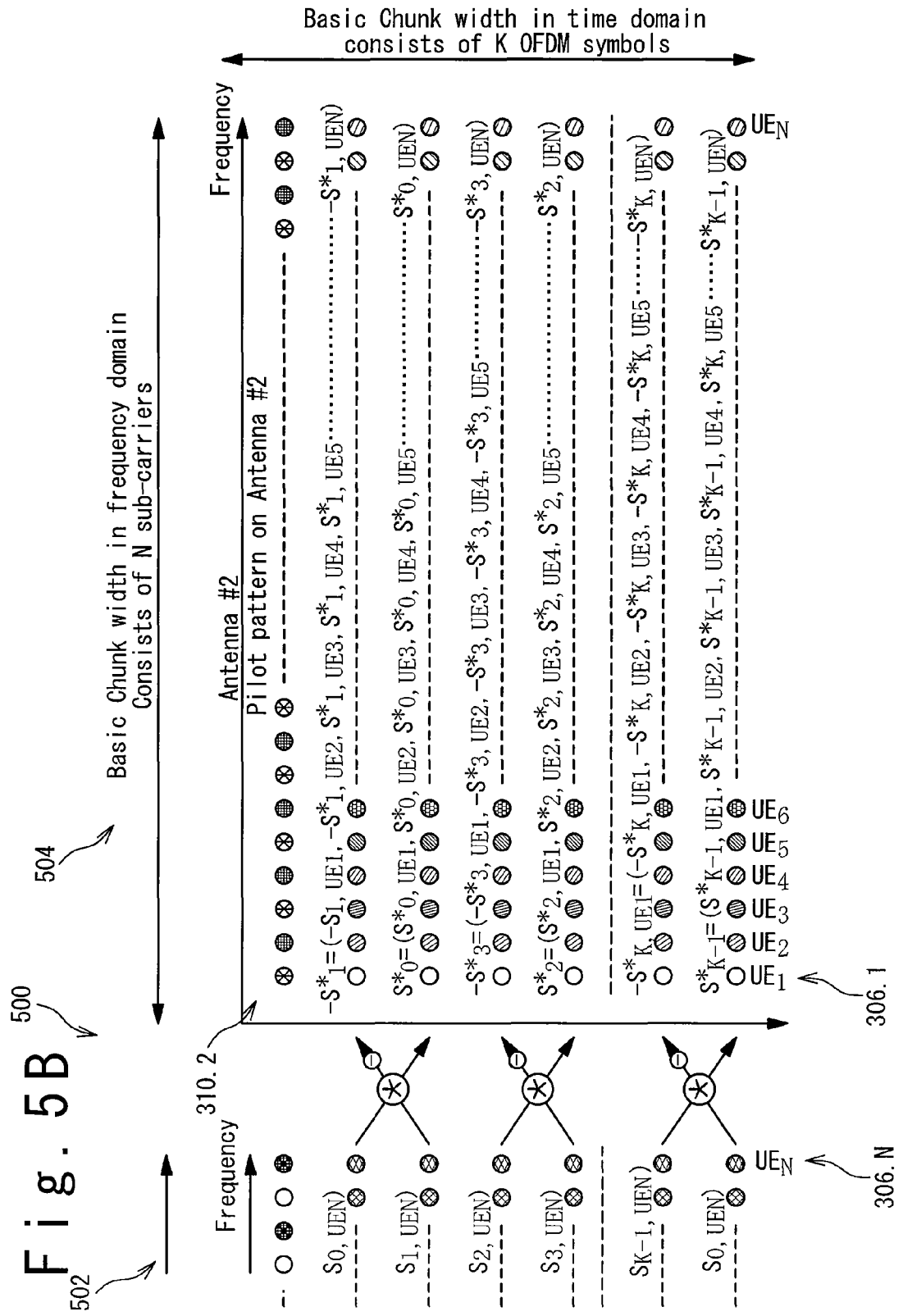

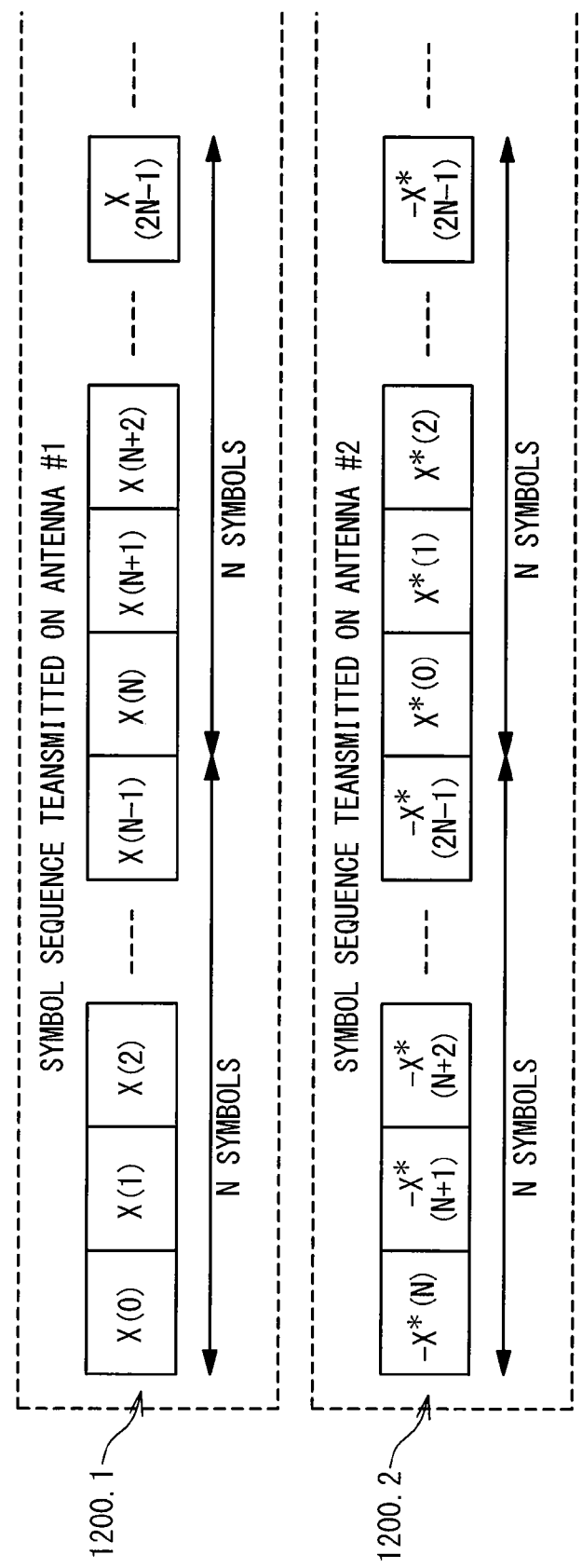

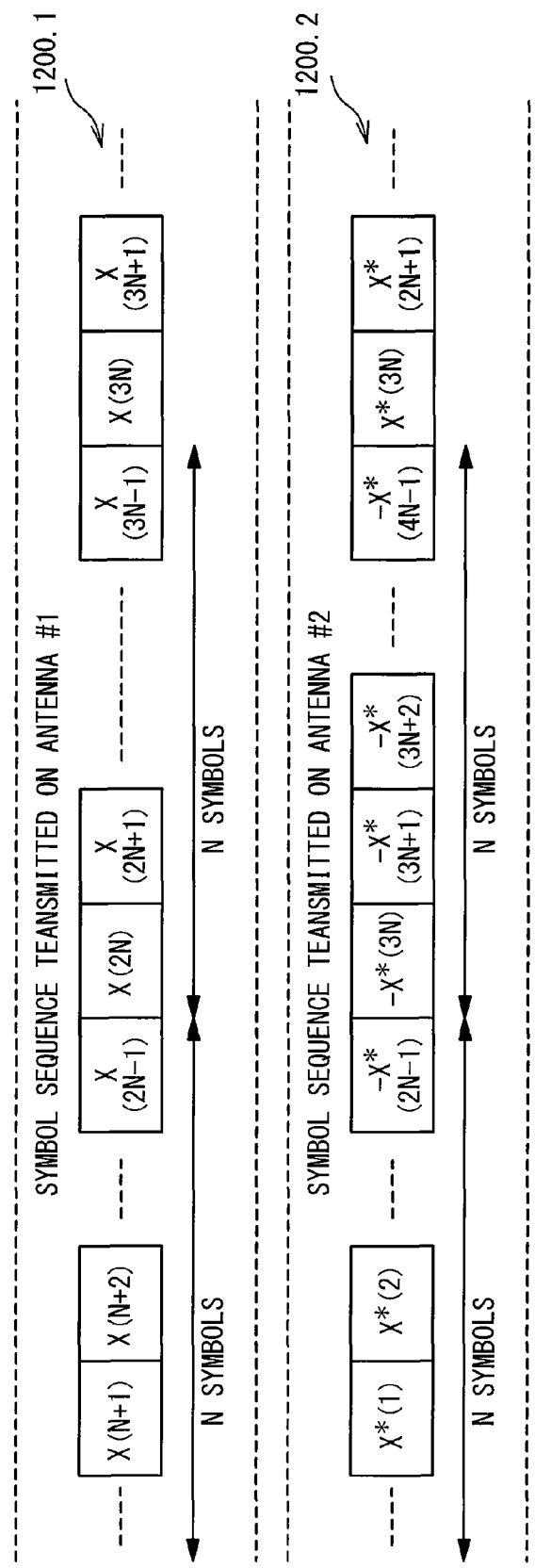

TRANSMIT DIVERSITY SCHEME

TECHNICAL FIELD

The present invention relates to methods for implementing transmit diversity in a telecommunication network.

BACKGROUND ART

As their name implies, "Super 3G" mobile telecommunications networks are intended to provide improvements over today's 3G mobile telecommunications networks. One such improvement being targeted is a tenfold improvement of the existing 3G data rate meaning Super 3G networks should provide a target data rate in the downlink direction of 100 Mbps and for in the uplink direction of 50 Mbps. It is expected that services available in future Super 3G mobile telecommunications networks shall be similar to the existing 3G HSDPA (High Speed Downlink Packet Access), MBMS (Multimedia broadcast-multicast services) and HSUPA (High Speed Uplink Packet Access) service but with significantly higher data rates.

In order to achieve such a high data rate in Super 3G networks a new radio access technology-orthogonal frequency division multiplexing (OFDM) has been introduced together with higher modulation (64-QAM) and using turbo or LDPC (low density parity check) coding schemes as well as other features such as multiple input multiple output (MIMO). OFDM is a modulation technique that can be used for high speed data communication, whose main idea is to send data in parallel over a number of spectrally overlapping orthogonal sub-channels.

OFDM is considered to have the certain advantages over other radio access technologies, including the following:

High spectral efficiency can be obtained by a careful selection of the frequencies for the so-called sub-carriers, by defining the frequency spacing between sub-carriers equal to the reciprocal of the OFDM symbol duration.

OFDM has superior power efficiency over other technologies as there is no crowding in signal space.

OFDM can be made robust to multi-path interference by introducing guard interval in between consecutive OFDM symbols in the time domain.

OFDM is robust to narrow band interference.

However, OFDM is quite sensitive to impairments such as phase noise, carrier frequency offset, I/Q imbalance, phase distortion and linearity issues, which can introduce inter-carrier interference, reduce SINR (Signal to Interference and Noise Ratio) and create intermodulation problems. These identified impairments always exist in implementations of OFDM and affect the ability to apply higher level modulation schemes and coding schemes, therefore making it more difficult to achieve the target data rates discussed above. Moreover they are also expensive to mitigate or reduce.

DISCLOSURE OF INVENTION

In broad concept the present inventor has identified that by introducing transmission diversity (TX diversity) provided by Space-Time encoding, into a network using OFDM at least partial compensation for the above identified impairments may be achieved.

In particular there is provided an algorithm for performing transmit diversity encoding in a transmitter and transmit diversity decoding in a receiver respectively. Embodiments of the present invention can conveniently be described in the context of a so-called "Super 3G" radio communications network. However the present invention should not be considered as being limited to this type of network.

In a first aspect the present invention provides a method of processing at least one sequence of data symbols to be transmitted over a wireless channel including N sub-carriers having different frequencies; the method including the steps of:

defining, in the at least one sequence of data symbols, a plurality of blocks of data symbols, each of the blocks of data symbols including one data symbol corresponding to each of the N sub-carriers, processing each of the blocks of data symbols such that the correspondence between at least two of the data symbols in the block and their respective sub-carriers are changed, to create a processed block in which each data symbol corresponds to one of the sub-carriers;

for each processed block of data symbols, generating a corresponding conjugated block of data symbols which includes N data symbols that are the complex conjugate of a corresponding data symbol in the processed block of data symbols;

processing pairs of the processed blocks of data symbols for transmission on a first antenna on the N sub-carriers in a temporal first order; and processing pairs of the conjugated blocks of data symbols for transmission on a second antenna on the N sub-carriers in the reverse temporal order.

The method can further include defining blocks of data symbols in one sequence of data symbols and where the pairs of processed blocks correspond to blocks of N data symbols received sequentially. Alternatively the method can include processing a plurality of sequences of data. In this case, to generate a corresponding plurality of blocks of data symbols, each of the blocks of data symbols including one data symbol corresponding to each of the N sub-carriers.

Processing each of the blocks of data symbols such that the correspondence between at least two of the data symbols in the block and their respective sub-carriers are changed can include changing the correspondence between the majority of the data symbols in the block and their respective sub-carriers. Processing each of the blocks of data symbols such that the correspondence between at least two of the data symbols in the block and their respective sub-carriers are changed can include changing the correspondence between the all of the data symbols in the block and their respective sub-carriers.

Processing each of the blocks of data symbols such that the correspondence between at least two of the data symbols in the block and their respective sub-carriers are changed preferably includes interleaving the data symbols in each block to change the respective correspondence with the N sub-carriers.

In a second aspect the present invention provides a method of processing at least one sequence of data symbols to be transmitted over a wireless channel; including (a) defining, in the at least one sequence of data symbols, a plurality of blocks of data symbols;

(b) processing the least one sequence of data symbols on a block-by-block basis to provide frequency diversity in the subsequently transmitted signal;

(c) processing the blocks of data symbols in groups of two or more blocks to provide time diversity in the subsequently transmitted signal; and (d) processing the blocks of data for transmission over at least two antennas to provide for spatial diversity in the subsequently transmitted signal.

Step (b) preferably includes, processing each of the blocks of data symbols such that the correspondence between at least two of the data symbols in the block and their respective sub-carriers are changed, to create a processed block in which each data symbol corresponds to one of the sub-carriers.

Step (c) can include, for each processed block of data symbols, generating a corresponding conjugated block of data symbols which includes N data symbols that are the complex conjugate of a corresponding data symbol in the processed block of data symbols.

Step (d) can include, processing groups of the processed blocks of data symbols for transmission on a first antenna on the N sub-carriers in a temporal first order; and processing equivalent groups of the conjugated blocks of data symbols for transmission on a second antenna on the N sub-carriers in a different temporal order.

In a third aspect the present invention provides a transmit diversity encoder configured to process at least one sequence of data symbols to be transmitted over a wireless channel including N sub-carriers having different frequencies, the encoder including:

a block defining stage configured to define, in the at least one sequence of data symbols, a plurality of blocks of data symbols;

a frequency encoder configured to process the blocks of data symbols to provide frequency diversity within the blocks of data symbols;

a space-time encoder configured to process the blocks of data in groups of two or more blocks to provide time diversity between blocks for transmission over different antennas.

Preferably the frequency encoder is configured to interleave the data symbols of a block in the frequency domain, to provide frequency diversity in the block.

The space-time encoder can be configured to generate a conjugated block of data symbols corresponding to each frequency encoded block of data symbols, including N data symbols that are the complex conjugate of a corresponding data symbol in the frequency encoded block of data symbols; and process pairs of the frequency encoded blocks for transmission on a first antenna in a temporal first order; and pairs of the conjugated blocks for transmission on a second antenna in the reverse temporal order.

In a further aspect there is provided a transmitter for a wireless communications network including at least two transmission antennas and a transmit diversity encoder as described herein. In another aspect the present invention provides a base station for a wireless communications network including such a transmitter.

BRIEF DESCRIPTION OF DRAWINGS

Illustrative embodiments of the present invention will now be described, by way of non-limiting example only, with reference to the accompanying drawings, in which:

FIG. 1 is a block diagram illustrating a transmitter including TX diversity encoder according to first embodiment of the present invention;

FIG. 2 is a block diagram illustrating a transmitter including TX diversity encoder according to second embodiment of the present invention;

FIG. 3A illustrates a TX diversity coding pilot and data symbol arrangement applicable to a single user's data to be transmitted with a high data-rate, according to one embodiment of the present invention;

FIG. 3B illustrates a TX diversity coding pilot and data symbol arrangement applicable to a single user's data to be transmitted with a high data-rate, according to one embodiment of the present invention;

FIG. 5B illustrates a TX diversity coding pilot and data symbol arrangement applicable to multiple users' data to be transmitted with a low data-rate or for signalling, according to an embodiment of the present invention;

FIG. 11A depicts an output symbol sequence from a STC encoder operating in accordance with an embodiment of the present invention;

FIG. 11B depicts an output symbol sequence from a STC encoder operating in accordance with an embodiment of the present invention;

BEST MODE FOR CARRYING OUT THE INVENTION

Figure 6:
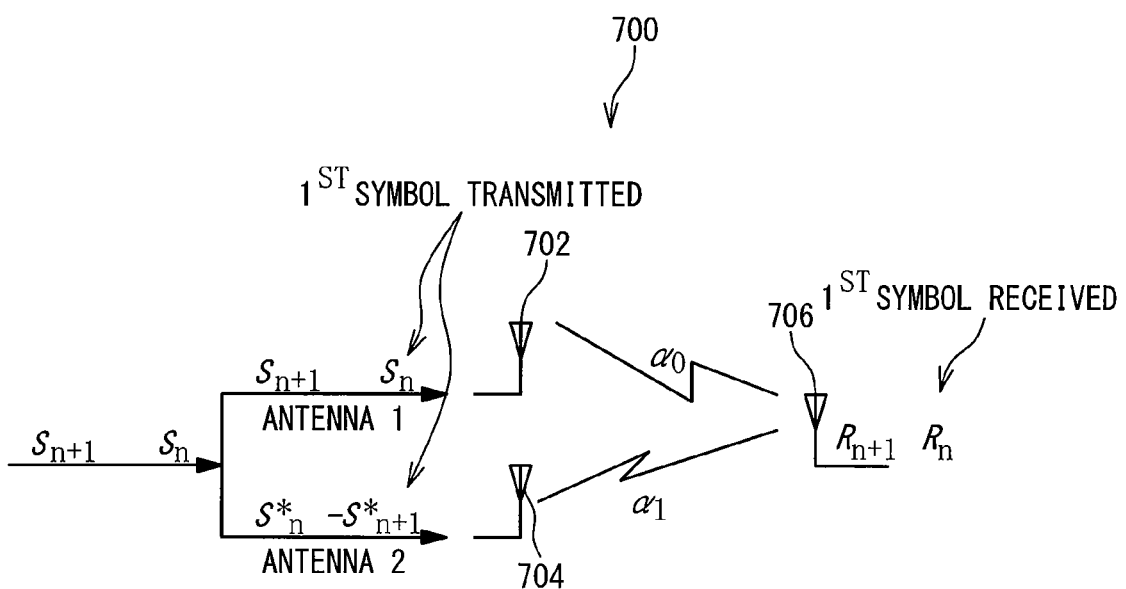
FIG. 6 illustrates schematically a prior art space-time encoder.

As discussed above, the present inventor has determined that prior art space-time encoding methods can be adapted for use in a telecommunications network that employs OFDM to at least partially ameliorate one or more of the drawbacks mentioned above. FIG. 6 depicts a typical space-time encoding (STC) arrangement operating according to the prior art. This base station 700 includes two antennas 702 and 704 to transmit a pair of symbols $S_n$ and $S_{n+1}$ over channels $\alpha_0$ and $\alpha_1$, respectively to user equipment (UE) 706. Using the prior art STC technique, the pair of symbols $S_n$ and is transmitted on the antenna 702 and the pair $-S^*_{n+1}$ and $S^*_n$ is transmitted on the antenna 704.

In order to perform the decoding at the UE 706, the symbols received at the UE 706 can be represented $R_n = \hat{S}_n \times \hat{\alpha}_0 + (-S^*_{n+1}) \times \hat{\alpha}_1$ $R_{n+1} = \hat{S}_{n+1} \times \hat{\alpha}_0 + (\hat{S}^*_n) \times \hat{\alpha}_1$ as: Where
$\hat{S}_n$ and $\hat{S}_{n+1}$ are estimated symbols which requires to be found $\hat{\alpha}_0$ and $\hat{\alpha}_1$ are channel estimates from the antennas 1 and 2 respectively Equation 1

In this example, the estimated received symbol $\hat{S}_n$ and $\hat{S}_{n+1}$ can be found using the following expressions $$\hat{S}_n = \frac{R_n \times \hat{\alpha}_0^* + R_{n+1}^* \times \hat{\alpha}_1}{\hat{\alpha}_0 \times \hat{\alpha}_0^* + \hat{\alpha}_1 \times \hat{\alpha}_1^*} \text{ and}$$

$$\hat{S}_{n+1} = \frac{R_{n+1} \times \hat{\alpha}_0^* - R_n^* \times \hat{\alpha}_1}{\hat{\alpha}_0 \times \hat{\alpha}_0^* + \hat{\alpha}_1 \times \hat{\alpha}_1^*}$$

Equation 2

However, in a telecommunications network using OFDM, consecutive data symbols on a sub-channel are not transmitted consecutively on the air interface, rather consecutive data symbols are transmitted at the same time on different sub-carriers (frequencies).

Three methods for implementing TX diversity using TX diversity encoder according to an embodiment of the present invention will be described in relation to the following transmission circumstances:

1. An implementation of TX diversity for use with high data rate user traffic, such as would typically arise when making high speed down link data packet transmissions to a UE e.g. application traffic.
2. Two implementations of TX diversity adapted for use with low data rate user traffic, such as signalling and/or control information. For this type of traffic two schemes will be described as follows:
   a. A TX diversity implementation adapted for use when data symbols from a single user are time multiplexed with other users' traffic; and
   b. A TX diversity implementation adapted for use when data symbols from a single user are frequency multiplexed with other users' traffic It should be noted that exemplary embodiments are described by way of example only and that the present invention is not limited to these implementations.

The illustrative TX diversity methods can be implemented in transmitters of the type depicted in FIGS. 1 and 2. In this regard, FIG. 1 depicts a first transmitter configuration capable of implementing an embodiment of the present invention.

The transmitter 100 receives a sequence of data symbols 102 at a TX diversity encoder 104 which includes frequency encoder block 106 and space-time encoder 108, details of the operation of which will be described in detail below in relation to preferred embodiments.

The space-time encoder 108 outputs two encoded data streams 110.1 and 110.2 corresponding to the two antennas 112.1 and 112.2. Each of the data streams 110.1 and 110.2 are passed to a respective OFDM modulation stage 114.1 and 114.2 to undergo OFDM modulation.

The output of the OFDM modulation stage 114.1 and 114.2 is then filtered in respective filtering stages 116.1 and 116.2 before conversion to an analogue signal by the digital to analogue conversion stages 118.1 and 118.2. The analogue signal is then used to modulate the radio frequency carrier signal by blocks 120.1 and 120.2 for transmission via respective antennas 112.1 and 112.2.

Further details of the operation of the TX diversity encoder 104 and the OFDM modulation stages 114.1 and 114.2 become apparent on reading the description of the preferred embodiment.

FIG. 2 is similar to FIG. 1 in that it depicts an exemplary transmitter configuration capable of implementing an embodiment of the present invention. Components of the transmitter 200 of FIG. 2 that are equivalent to components depicted in FIG. 1 have been labelled with corresponding reference numerals, and their operation will not be discussed in detail.

In FIG. 2, the transmitter 200 receives an input data sequence 102 which is input into the TX diversity encoder 202. In the embodiment of FIG. 2 the TX diversity encoder 202 includes an initial stage 204 where serial to parallel conversion of the data symbol sequence 102 is performed and frequency encoding and interleaving is also conducted. The frequency encoded interleaved data for each of the end sub-carriers is then applied to a space-time encoder 206. The output of the space-time encoder is then passed to the OFDM modulation stages 208.1 and 208.2 corresponding to respective antennas 112.1 and 112.2 of the transmitter 200. Further detail of the operation of the TX diversity encoder 202 and the OFDM modulation stages 208.1 and 208.2 will be described below.

FIGS. 3A, 3B, 4A, 4B, 5A and 5B depict the user and pilot data symbols to be transmitted over a given time period on two antennas (112.1 and 112.2). In this example, on each of the antennas 112.1 and 112.2 the respective chunks of data symbols 302 and 304 are transmitted across N sub-carrier frequencies which are depicted as columns 306.1 to 306.N. Transmissions on a given time slot are represented across rows of the diagram, meaning all data symbols on row 308.0 are transmitted simultaneously on their respective sub-carriers 1 to N followed by data symbols of row 308.1 and so on until the end of the time period depicted when data symbols on row 308.K are transmitted.

In a first embodiment of the TX diversity scheme illustrated in FIGS. 3A and 3B, which can be advantageously applied to high data rate user traffic, e.g. high speed down link data packet transmissions to a UE the data symbols of a single user occupy the whole OFDM physical channel unit (i.e. all sub-carrier frequencies over the selected time period) and are not multiplexed with other user's data symbols. This is illustrated in FIGS. 3A and 3B, which depict the pilot and data symbol arrangement 300 for transmission on a first antenna (112.1) and a second antenna (112.2) after the TX diversity encoding applicable for OFDM technology.

In this example, the pilot pattern 310.1 and 310.2 for both antennas 112.1 and 112.2 are comprised of pilot symbols 312.1 for antenna 112.1 interleaved in the frequency domain with the pilot symbols 312.2 for antenna 112.2. The pilot pattern vector transmitted on antenna 112.1 is orthogonal with that transmitted on antenna 112.2. This allows the UE to distinguish a received signal from antenna 112.1 from the signal received from antenna 112.2. As can be seen the pilot patterns 310.1 and 310.2 are time multiplexed with user traffic (data rows 308.0 to 308.K) on each sub-carrier 306.1 to 306.N.

In this embodiment, time diversity between the two data symbols transmitted on the antennas 112.1 and 112.2 is provided by reversing the order of transmission of corresponding pairs of symbol blocks on the two antennas. For example, take the pair of symbols blocks 314.1A and 314.1B which, on antenna 112.1, are transmitted in a first order i.e. symbol block 314.1A followed by symbol block 314.1B. On the second antenna 112.2 the corresponding symbol blocks 314.2A and 314.2B are transmitted in the opposite order, i.e. symbol block 314.2B followed by symbol block 314.1B.

Figure 7:
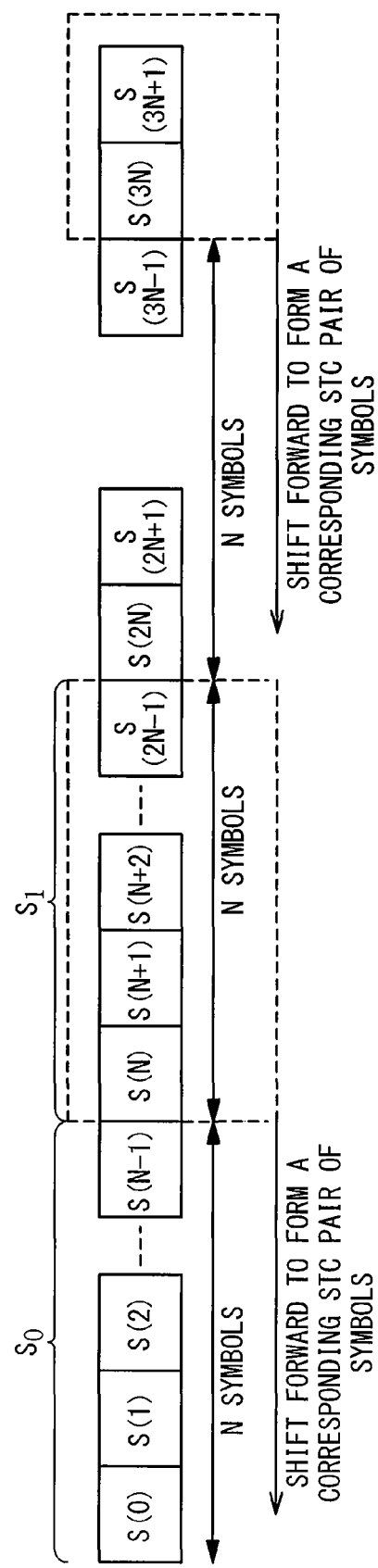
FIG. 7 depicts a symbol sequence for input into the frequency encoder depicted in FIG. 1.

When implementing the present embodiment, the frequency encoder block 106 of the transmitter 100 of FIG. 1 takes the number of sub-carriers allocated to the user for data packet transmission, which is N in this case, as an input and performs a block shifting process as illustrated in FIG. 7.

Figure 8:
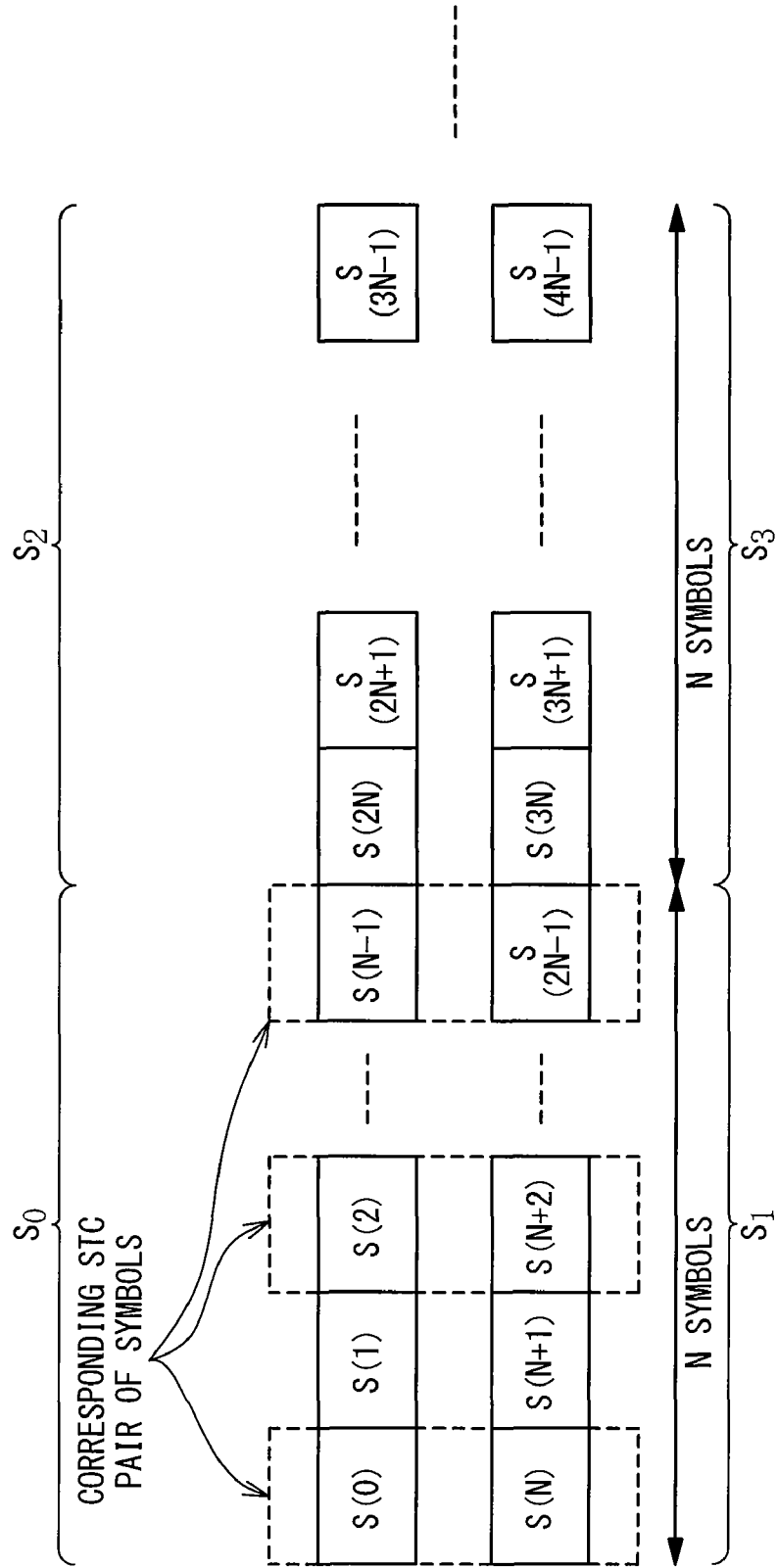
FIG. 8 depicts a symbol sequence of FIG. 7 after block shifting has been applied according to an embodiment of the present invention.

FIG. 7 depicts a sequence of received data symbols (e.g. input sequence 102 of FIG. 1). The first N data symbols S(0) to S(N−1) are grouped to form a first symbol block $S_0$. The next N data symbols S(N) to S(2N−1) are grouped to form symbol block $S_1$, which is time shifted so as to be paired with vector $S_0$. Similarly following symbol blocks S2 and S3 etc. are paired together on a block-by-block basis as shown in FIG. 8.

Figure 9:
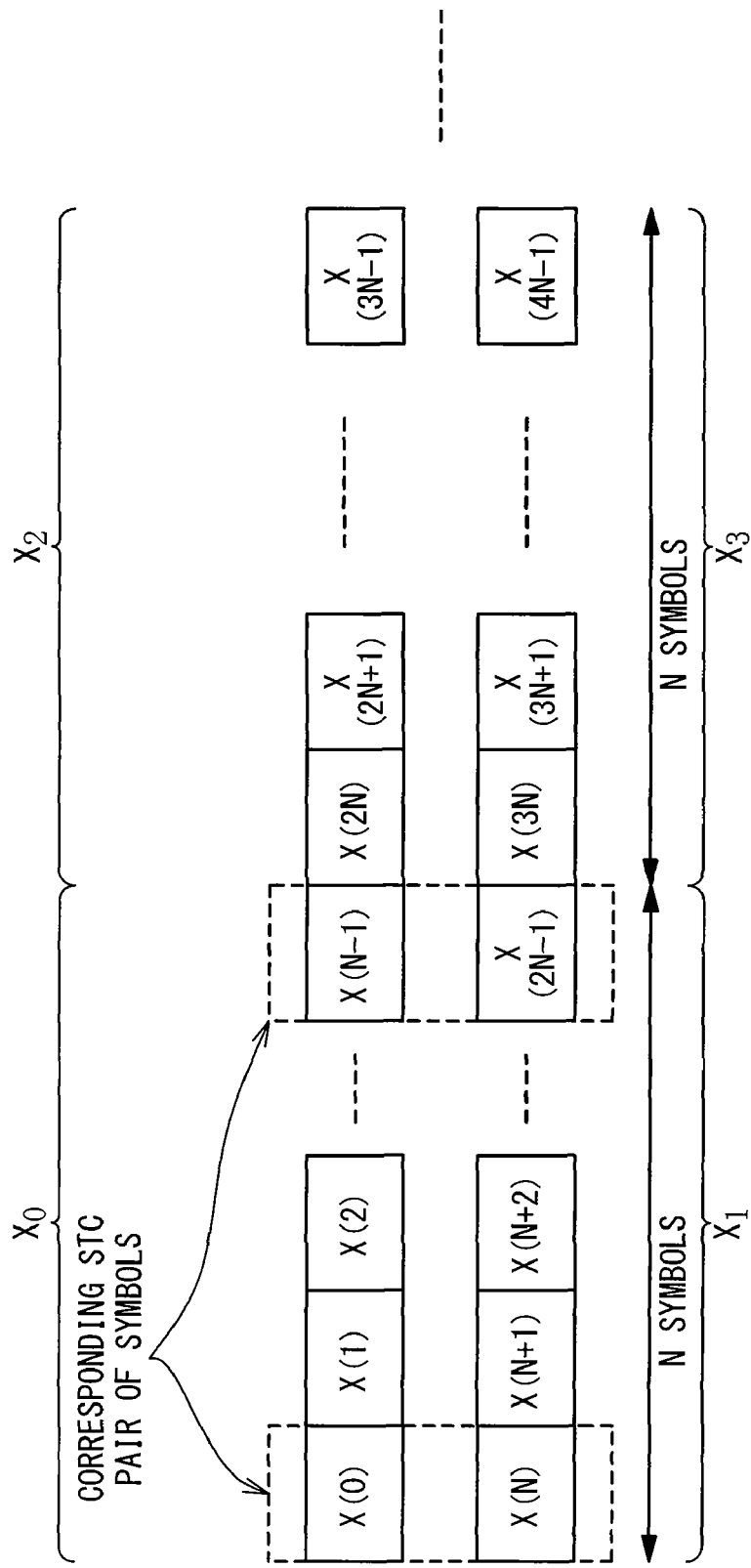
FIG. 9 depicts a symbol sequence of FIG. 8 after interleaving according to an embodiment of the present invention.

The symbols in each block of N symbols (e.g. $S_1$) are then interleaved to generate a corresponding interleaved block of symbols (e.g. $X_1$) of length N as being illustrated in FIG. 9. This interleaving of consecutive symbols in a block, e.g. $S_1$, maximises the frequency diversity of consecutive symbols by preventing consecutive symbols from being transmitted on adjacent sub-carrier frequencies. This interleaving step could also be integrated with other data traffic from other users to maximise the frequency diversity of the whole transmitter bandwidth.

Figure 10:
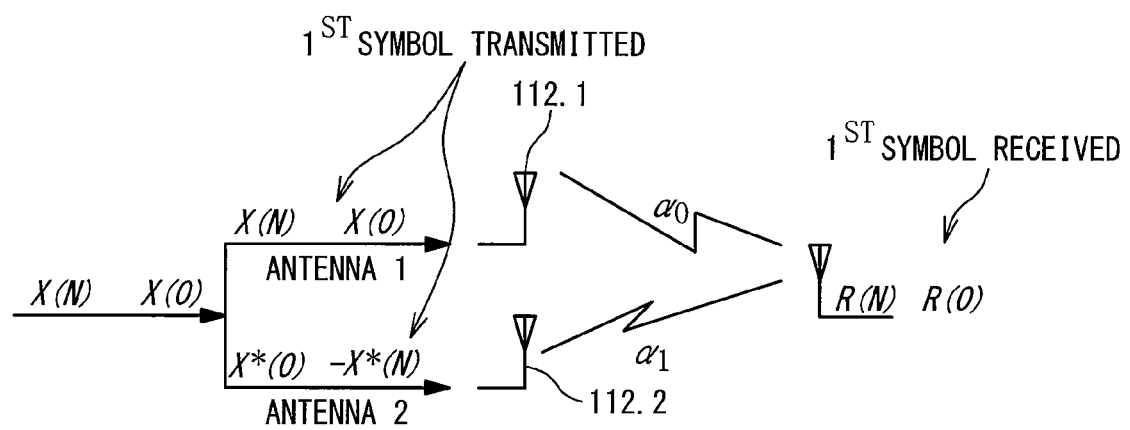
FIG. 10 illustrates schematically a space-time encoder according to an embodiment of the present invention.

The interleaved blocks of symbols (e.g. $X_1$) are then passed to the space-time encoder (108 of FIG. 1), in parallel for space-time encoding. The space-time encoder 108 then takes pair of symbols e.g. [X(0), X(N)], [X(1), X (N+1)], [X(2), X (N+2)] . . . as inputs and performs space-time encoding on a pair-by-pair basis for each sub carrier depicted in FIG. 10. In FIG. 10 a symbol pair X(0) and X(N) for a first sub-carrier are received, and further processed for transmission on a first antenna 112.1. As described above the complex conjugate of the symbol pair X*(0)−X*(N) are transmitted on the second antenna 112.2 on the same sub-carrier. This is illustrated more clearly in FIGS. 11A and 11B which depict the output of the space time encoder 108.

FIGS. 11A and 11B depict the symbol sequences 1200.1 and 1200.2 for transmission on antennas 112.1 and 112.2 respectively. On the first antenna 112.1 symbols X(0) to X(N−1) are transmitted across the N sub-carrier frequencies, followed by symbols X(N) to X(2N−1), whereas on the second antenna 112.2 symbols −X*(N) to −X(2N−1) are first transmitted across the sub-carriers, followed by symbols X*(0) to X*(N−1).

Figure 4A:
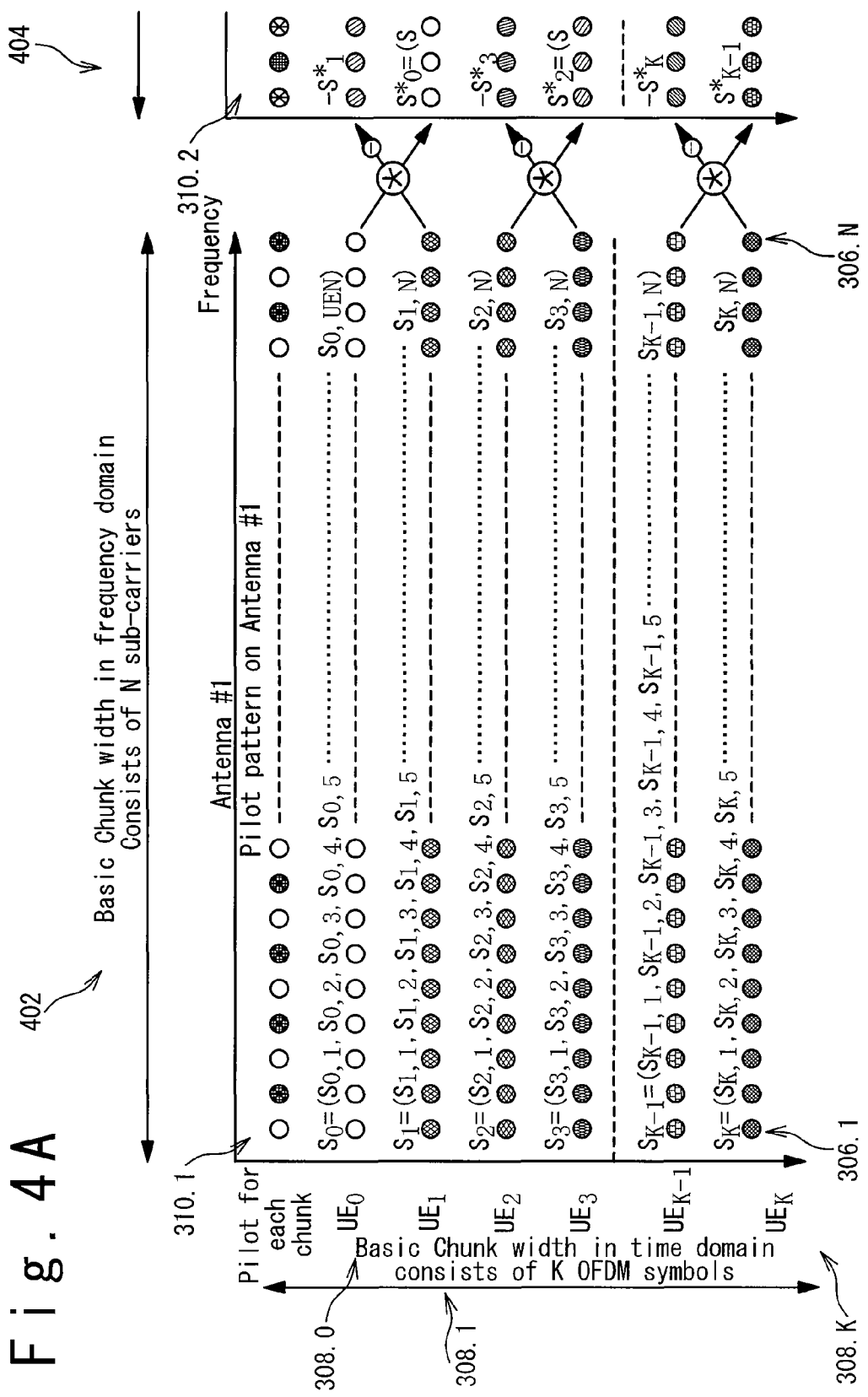
FIG. 4A illustrates a TX diversity coding pilot and data symbol arrangement applicable to multiple users' data to be transmitted with a low data-rate or for signalling, according to an embodiment of the present invention.
Figure 4B:
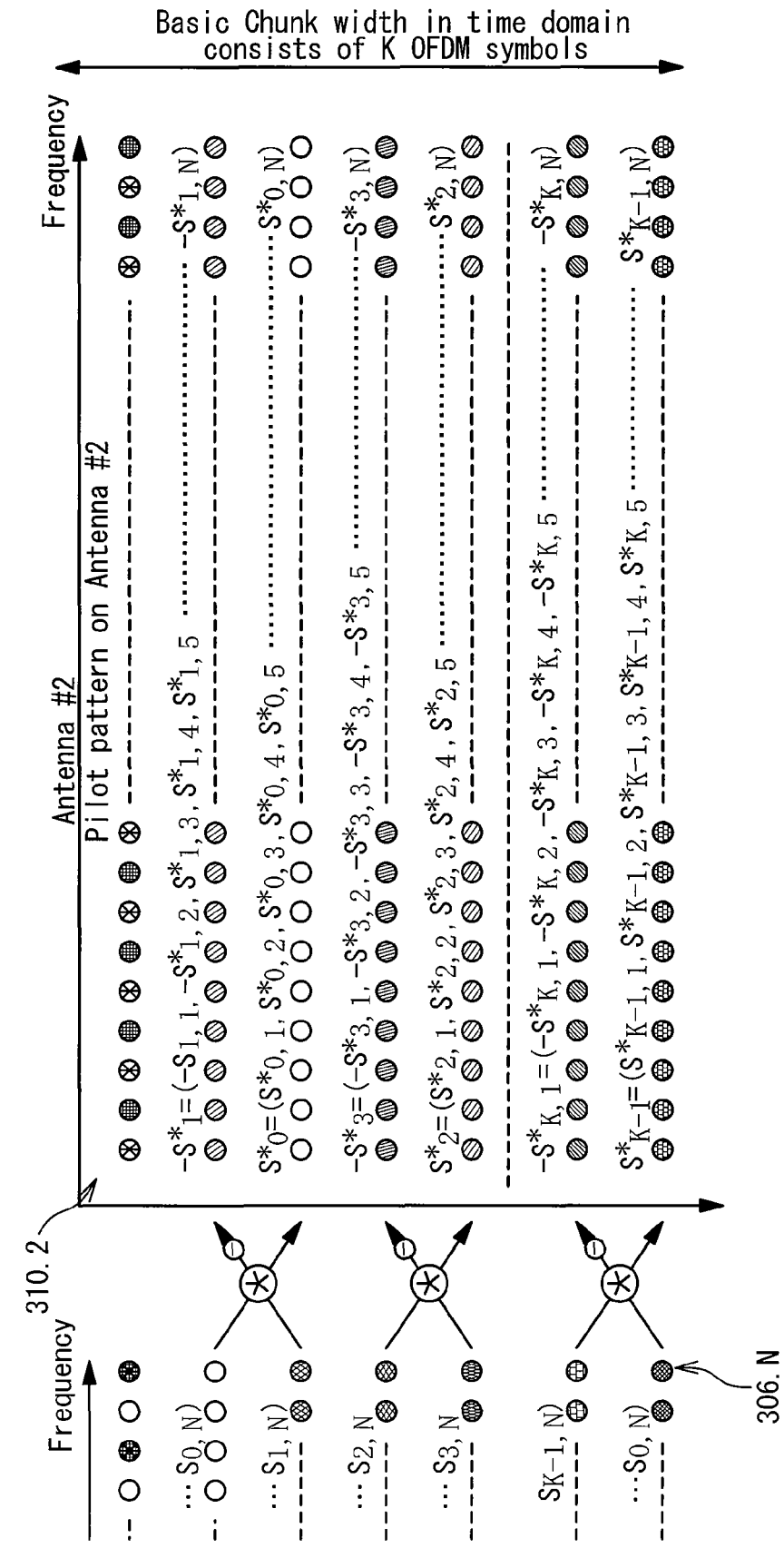
FIG. 4B illustrates a TX diversity coding pilot and data symbol arrangement applicable to multiple users' data to be transmitted with a low data-rate or for signalling, according to an embodiment of the present invention.
Figure 5A:
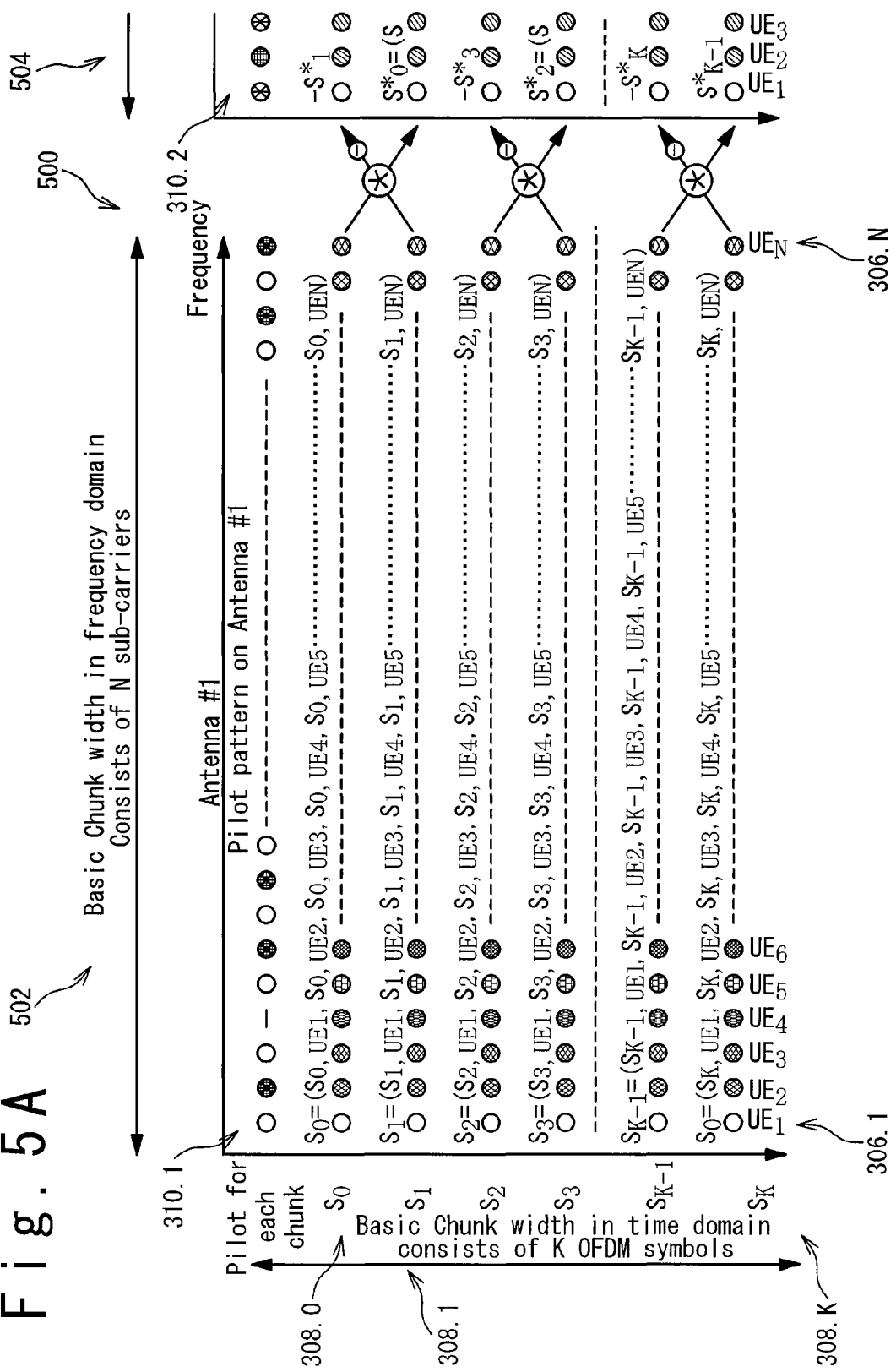
FIG. 5A illustrates a TX diversity coding pilot and data symbol arrangement applicable to multiple users' data to be transmitted with a low data-rate or for signalling, according to an embodiment of the present invention.

Alternative methods of achieving of TX diversity using a TX diversity encoder according to an embodiment of the present invention for use with low data rate user traffic, such as signalling and/or control information for establishing peer to peer communication between UE and BS will now be described in connection with FIGS. 4A, 4B, 5A and 5B. FIGS. 4A and 4B depict the situation where the data symbols from a single user are time multiplexed with other user traffic, whereas FIGS. 5A and 5B depict the situation where a user's data is frequency multiplexed with other user traffic.

Turning firstly to FIGS. 4A and 4B, which depict a TX diversity implementation adapted for use when data symbols from a single user is time multiplexed with other users traffic. FIGS. 4A and 4B, depict the pilot and data symbol arrangement 400 for transmission on a first antenna (112.1) and a second antenna (112.2) after the TX diversity encoding applicable for OFDM technology according to a second embodiment of the present invention. In this example, the pilot pattern 310.1 and 310.2 for both antennas 112.1 and 112.2 are the same as in the previous embodiment. As in the previous embodiment, the pilot patterns 310.1 and 310.2 are time multiplexed with multiple users' traffic.

Again the respective chunks of data symbols 302 and 304 are transmitted across N sub-carrier frequencies which are depicted as columns 306.1 to 306.N. Transmissions on a given time slot are represented across rows of the diagram, meaning all data symbols on row 308.0 are transmitted simultaneously on their respective sub-carriers 1 to N followed by data symbols of row 308.1 and so on until the end of the time period depicted when data symbols on row 308.K are transmitted. In this embodiment the data of multiple users are transmitted across all sub-carriers in a time multiplexed manner, meaning that each row e.g. 308.0 of data in the chunks 302 contains data symbols relating to only a single UE, e.g. $UE_0$ to $UE_K$.

In this embodiment, partial TX diversity and full frequency diversity can be achieved by using the following method.

Data corresponding to each UE are rate matched so that the number of symbols transmitted on the predefined number of sub-carriers is equal for each user. In this way the block shifting step described in connection with the first embodiment can be avoided. The frequency encoder 106 of the TX diversity encoder 104 therefore, begins by performing block frequency interleaving on data symbol blocks e.g. $S_0$ corresponding to each UE, to achieve frequency diversity.

Figure 12:
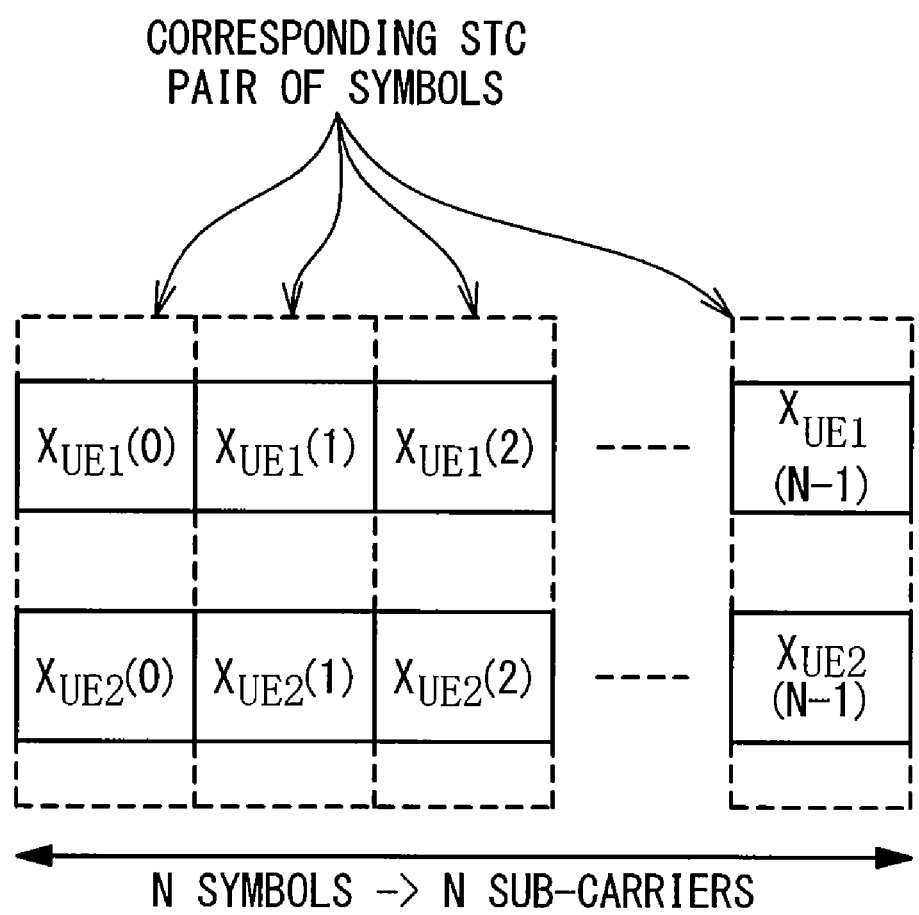
FIG. 12 depicts a symbol sequence for input into the frequency encoder depicted in FIG. 2.
Figure 13:
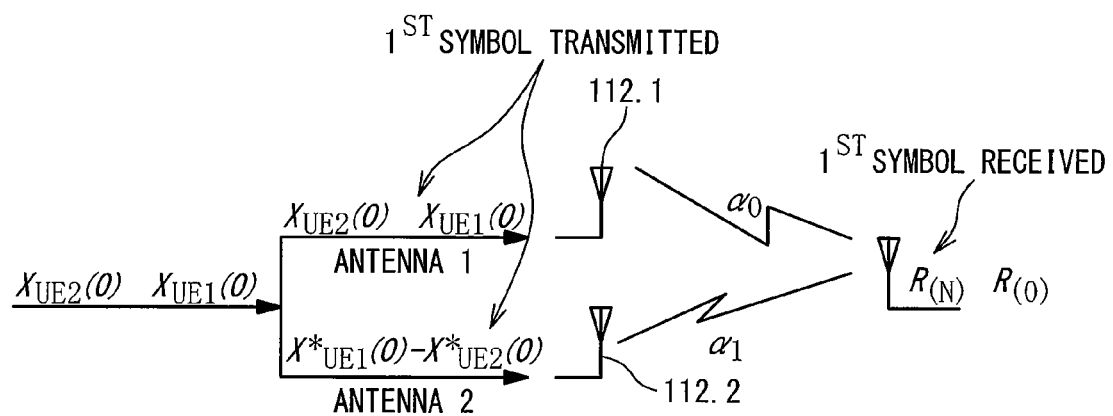
FIG. 13 illustrates schematically a space-time encoder according to a further embodiment of the present invention.
Figure 14:
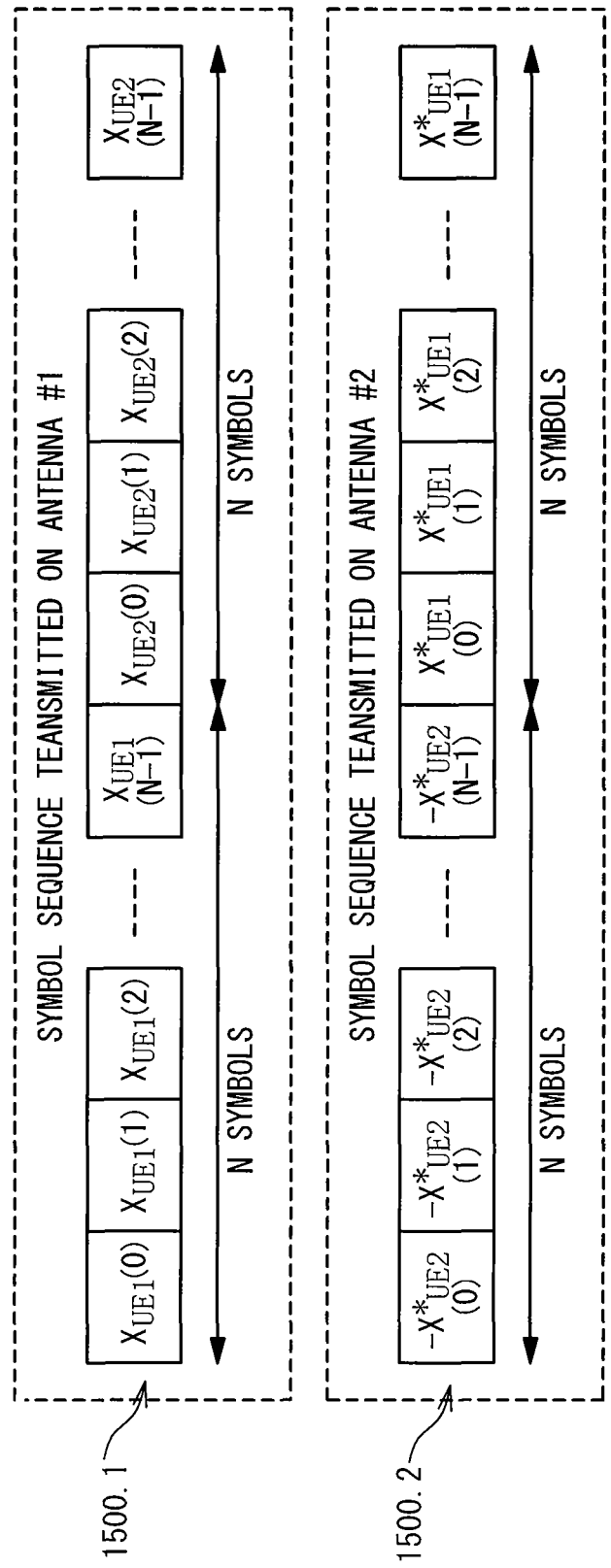
FIG. 14 depicts an output symbol sequence from a STC encoder of FIG. 13.

Next the space-time encoder 108 operates on the input symbol sequences corresponding to two UEs in order to form a pair of symbol blocks for space-time encoding as shown in FIGS. 13 and 14. This process is similar to that described in connection with the first embodiment. However, as depicted in FIG. 12 the paired, interleaved symbol blocks $X_{UE1}$ and $X_{UE2}$ relating to different UE data are passed to the space-time encoder (108 of FIG. 1), in parallel for space-time encoding. The space-time encoder 108 then takes pair of symbols e.g. [$X_{UE1}$, (0), $X_{UE2}$(0)], [$X_{UE1}$, (1), $X_{UE2}$(1)], [$X_{UE1}$(N), $X_{UE2}$(N)] as inputs and performs space-time encoding on a pair-by-pair basis for each sub carrier depicted in FIG. 13. In FIG. 13 a symbol pair $X_{UE1}$(0), $X_{UE2}$(0) for a first sub-carrier are received, and further processed for transmission on a first antenna 112.1. As described above the complex conjugate of the symbol pair $X^*_{UE1}$(0) and $-X^*_{UE2}$(0) are transmitted on the second antenna 112.2 on the same sub-carrier.

In accordance with this method, FIG. 14 depicts the symbol sequences 1500.1 and 1500.2 for transmission on antennas 112.1 and 112.2 respectively. On the first antenna 112.1 symbols $X_{UE1}$(0) to $X_{UE1}$(N−1) are transmitted across the N sub-carrier frequencies, followed by symbols $X_{UE2}$(0) to $X_{UE2}$(N−1), whereas on the second antenna 112.2 symbols $-X^*_{UE2}$(0) to $-X^*_{UE2}$(N−1) are first transmitted across the sub-carriers, followed by symbols $-X^*_{UE1}$(0) to $X^*_{UE1}$(N−1).

FIGS. 5A and 5B depict a second method of implementing TX diversity that can be advantageously implemented in the situation where a user's data is frequency multiplexed with other user traffic. FIGS. 5A and 5B, depict the pilot and data symbol arrangement 500 for transmission on a first antenna (112.1) and a second antenna (112.2) after the TX diversity encoding applicable for OFDM technology according to a third embodiment of the present invention. Again, the pilot pattern 310.1 and 310.2 for both antennas 112.1 and 112.2 are the same as in the previous embodiments. As in the previous embodiment, the pilot patterns 310.1 and 310.2 are time multiplexed with multiple users' traffic.

Respective chunks of data symbols 302 and 304 are transmitted across N sub-carrier frequencies which are depicted as columns 306.1 to 306.N. Transmissions on a given time slot are represented across rows of the diagram, meaning all data symbols on row 308.0 are transmitted simultaneously on their respective sub-carriers 1 to N followed by data symbols of row 308.1 and so on until the end of the time period depicted when data symbols on row 308.K are transmitted. In this embodiment the data of multiple users are transmitted in all timeslots but are transmitted only on a single sub-carrier, i.e. the users' traffic are frequency multiplexed. Thus in FIGS. 5A and 5B meaning that each column e.g. 306.1 of data symbols in the chunk 302 contains data symbols relating to only a single UE, e.g. $UE_1$.

Alternative methods of achieving of TX diversity that are adapted for use with low data rate user traffic, such as signalling and/or control information for establishing peer to peer communication between UE and BS will now be described in connection with FIGS. 4A, 4B, 5A and 5B. FIGS. 4A and 4B depict the situation where the data symbols from a single user are time multiplexed with other user traffic, whereas FIGS. 5A and 5B depict the situation where a user's data is frequency multiplexed with other user traffic, whereas each row e.g. 308.0 of data contains data symbols relating to all UEs to be transmitted on different frequency sub-carriers. To implement TX diversity on this type of data traffic the frequency encoder 106 of the TX diversity encoder 104 is transparent and the space-time encoder 108 functions as shown in FIG. 6.

Returning to FIG. 1 in each of the cases described above, the outputs of the space-time encoder 108 (irrespective of the nature of the data and TX diversity method applied) are then input to the respective OFDM modulators 114.1 and 114.2 for serial to parallel conversion, modulation using Inverse Fast Fourier Transform and insertion of the cyclic prefix for the purpose of combating multipath delay symbols prior to further processing by blocks 116 to 120 and transmission.

As mentioned above, FIG. 2 depicts a second TX hardware configuration configured for use with an embodiment of the present invention. In FIG. 2 the TX diversity encoder 202 is configured to operate in the following fashion.

For high data rate user traffic and low data rate user traffic that is time multiplexed, as in FIGS. 4A and 4B, the initial stage 204 receives a block of N symbols to be transmitted on the N sub-carriers and performs an interleaving procedure as described in connection with FIG. 9. However, in the case of low rate traffic that is frequency multiplexed as depicted in FIGS. 5A and 5B this stage is transparent, and the traffic from the plurality of users is input in parallel into the space-time encoder 206.

Figure 15:
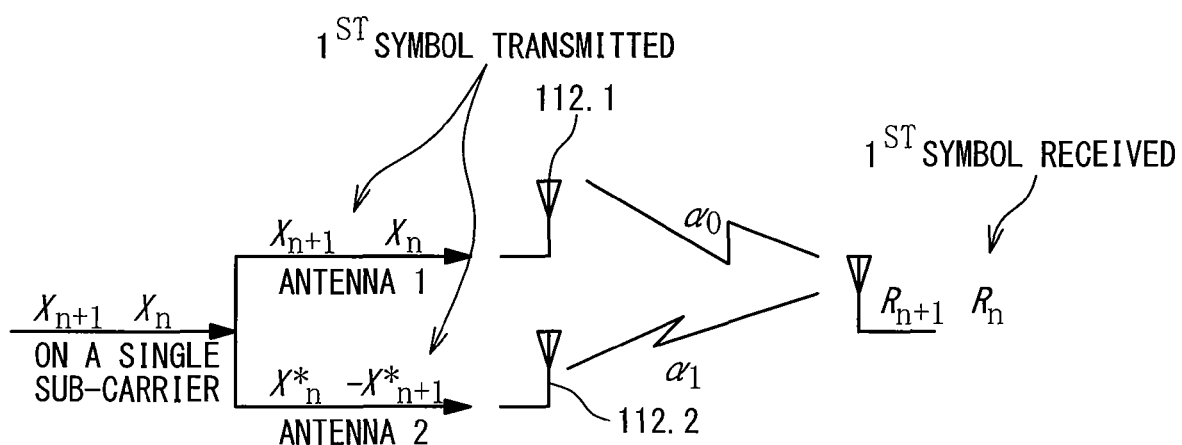
FIG. 15 depicts an output symbol sequence from a STC encoder operating in accordance with another embodiment of the present invention.

In this embodiment, the space-time encoder 206 of FIG. 2 performs space-time encoding on each sub-carrier by taking a pair of symbols on one sub-carrier and performing space-time encoding on each pair of symbols according to FIG. 15. The space time encoding of FIG. 15 operates in a similar fashion to FIG. 6 except that rather than operating on the input data symbols $S_n$ and $S_{n+1}$ directly, it operates on the interleaved symbols generated by the initial stage 204, i.e. $X_n$ and $X_{n+1}$. In this regard, the symbol pair $X_n$ and $X_{n+1}$ is transmitted on the antenna 112.1 and the symbol pair $-X^*_{n=1}$ and $X^*_n$ is transmitted on the antenna 112.2.

Figure 16:
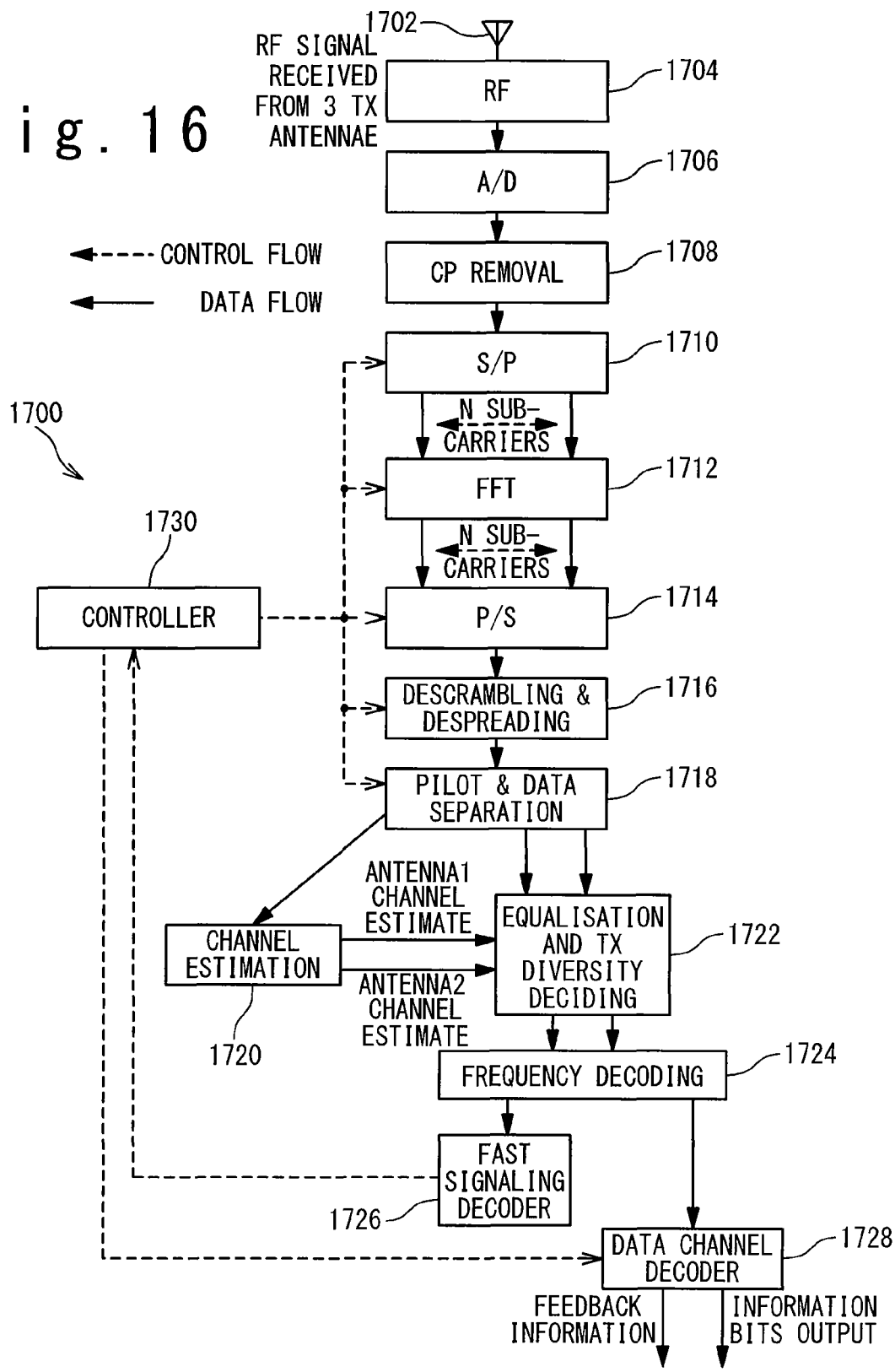
FIG. 16 is a block diagram illustrating a receiver configured to receive a signal encoded according to an embodiment of the present invention.

FIG. 16 depicts a block diagram of a receiver operating according to an embodiment of the present invention. In FIG. 16 the receiver 1700 receives a radio frequency signal at antenna 1702. The received signal is demodulated at the RF demodulation stage 1704 and converted to a digital signal by the analogue to digital converter 1706. The digital signal is then passed to the cyclic prefix removal stage 1708 and the common pilot symbols are removed.

The traffic signals undergo serial to parallel conversion in block 1710 and signals corresponding to the N sub-carriers are passed to the FFT stage 1712 for Discrete Fourier Transform using FFT processing algorithm. The N frequency domain signals are then converted back into a serial data stream by the parallel to serial converter 1714 and passed to the descrambling and despreading stage 1716. The output of the descrambling and despreading stage 1716 is passed to the pilot data separation stage 1718 where pilot symbols are removed for use by the channel estimation stage 1720 to generate a channel estimate for transmission antennas 1 and 2.

The channel estimates corresponding to two transmission antennas are passed to the equalisation and transmission diversity decoding stage 1722 which operates as discussed below. The frequency decoding block 1724 processes the output of the equalisation transmission diversity decoding stage 1722 and passes a first output signal to the signalling decoder 1726 and a second output signal to the data channel decoder 1728.

Control information decoded by the fast signalling decoder 1726 is then passed through the controller 1730 which is responsible for configuring the following blocks:

Serial to parallel block 1710;
FFT block 1712;
Parallel to serial block 1714;
Descrambling & de-spreading block 1716; and
Pilot & data separation block 1718;

to correctly receive and demodulate the desired signal according to different topologies of traffic multiplexing at the transmitted base station.

For the high data-rate user traffic as shown in FIGS. 3A and 3B these blocks are configured to receive and demodulate entire block (time and frequency) when performing TX diversity decoding and frequency decoding. For the low data rate user traffic as depicted in FIGS. 4A, 4B, 5A and 5B, the data received shall be processed depending on the type of multiplexing used. In the event that the multiple users' data is time-division multiplexed (TDM) (see FIGS. 4A and 4B), two consecutive symbols in time domain are received and demodulated on all allocated sub-carriers. In this case the UE is configured to either receive and demodulate one symbol earlier and one symbol on time on all allocated sub-carriers; or one symbol on time and one symbol later on all allocated sub-carriers. This will depend on the way in which user data is multiplexed. The user equipment will receive suitable signalling data to inform it of this. When the multiple users' data is frequency-division multiplexed (FDM) (as per FIGS. 5A and 5B), all symbols on all allocated sub-carrier are received and demodulated.

The equalisation and TX diversity decoding block 1722, performs the TX diversity decoding as follows. For the high data-rate user traffic as shown in FIGS. 3A and 3B an estimated symbol $\hat{S}_i$ can be found using the following mathematical expression:

$$\hat{S}_i = \frac{R_i \times \hat{\alpha}_0^* + R_{N+i}^* \times \hat{\alpha}_1}{\hat{\alpha}_0 \times \hat{\alpha}_0^* + \hat{\alpha}_1 \times \hat{\alpha}_1^*} \quad \text{Equation 3}$$

and $$\hat{S}_{N+i} = \frac{R_{N+i} \times \hat{\alpha}_0^* - R_i^* \times \hat{\alpha}_1}{\hat{\alpha}_0 \times \hat{\alpha}_0^* + \hat{\alpha}_1 \times \hat{\alpha}_1^*}$$

where

N is the number of sub-carriers on which data symbols are transmitted in parallel $\hat{\alpha}_0$ is the average channel estimate at position $R_i$ and $R_{N+i}$ on the first antenna 112.1

-continued $\hat{\alpha}_1$ is the average channel estimate at position $R_i$ and $R_{N+i}$ on the second antenna 112.2

For the low data rate user traffic as depicted in FIGS. 4A and 4B when the UE is configured to receive and demodulate one OFDM symbol earlier and one OFDM symbol on time, the following mathematical expression (Equation 4) is used to perform TX diversity demodulation to find an estimated $\hat{S}_i$ $$\hat{S}_i = \frac{R_i \times \hat{\alpha}_0^* - R_{i-N}^* \times \hat{\alpha}_1}{\hat{\alpha}_0 \times \hat{\alpha}_0^* + \hat{\alpha}_1 \times \hat{\alpha}_1^*} \qquad \text{Equation 4}$$

where $N$ is the number of sub-carriers on which data symbols are transmitted in parallel $\hat{\alpha}_0$ is the average channel estimate at position $R_i$ and $R_{i-N}$ on the first antenna 112.1

$\hat{\alpha}_1$ is the average channel estimate at position $R_i$ and $R_{i-N}$ on the second antenna 112.2

In the case where the UE is configured to receive and demodulate one OFDM symbol on time and one OFDM symbol later, the following mathematical expressing (Equation 5) is used to perform TX diversity demodulation to find an estimated $\hat{S}_i$ $$\hat{S}_i = \frac{R_i \times \hat{\alpha}_0^* + R_{N+i}^* \times \hat{\alpha}_1}{\hat{\alpha}_0 \times \hat{\alpha}_0^* + \hat{\alpha}_1 \times \hat{\alpha}_1^*} \qquad \text{Equation 5}$$

where $N$ is the number of sub-carriers on which data symbols are transmitted in parallel $\hat{\alpha}_0$ is the average channel estimate at position $R_i$ and $R_{N+i}$ on the first antenna 112.1

$\hat{\alpha}_1$ is the average channel estimate at position $R_i$ and $R_{N+i}$ on the second antenna 112.2

For the low data rate user traffic as depicted in FIGS. 5A and 5B which uses FDM the two consecutively received symbols $\hat{S}_i$ and $\hat{S}_{i+1}$ can be TX diversity demodulated as follow using the following expressions:

$$\hat{S}_i = \frac{R_i \times \hat{\alpha}_0^* + R_{i+1}^* \times \hat{\alpha}_1}{\hat{\alpha}_0 \times \hat{\alpha}_0^* + \hat{\alpha}_1 \times \hat{\alpha}_1^*} \text{ and} \qquad \text{Equation 6}$$

$$\hat{S}_{i+1} = \frac{R_{i+1} \times \hat{\alpha}_0^* - R_i^* \times \hat{\alpha}_1}{\hat{\alpha}_0 \times \hat{\alpha}_0^* + \hat{\alpha}_1 \times \hat{\alpha}_1^*}$$

where $\hat{\alpha}_0$ is the average channel estimate at position $R_i$ and $R_{i+1}$ on the first antenna 112.1

$\hat{\alpha}_1$ is the average channel estimate at position $R_i$ and $R_{i+1}$ on the second antenna 112.2

The frequency decoding block 1724 performs block (K×N) de-interleaving on the TX diversity decoded symbols from block 1722. Where N is the number of sub-carriers which is allocated to a UE and K is the number of symbols in the block.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of processing at least one sequence of data symbols to be transmitted over a wireless channel including N sub-carriers having different frequencies, comprising:
    defining, in the at least one sequence of data symbols, a plurality of blocks of data symbols, each of said blocks of data symbols including one data symbol corresponding to each of the N sub-carriers,
    processing each of said blocks of data symbols such that the correspondence between at least two of the data symbols in the block and their respective sub-carriers are changed, to create a processed block in which each data symbol corresponds to one of said sub-carriers;
    for each processed block of data symbols, generating a corresponding conjugated block of data symbols which includes N symbols that are the complex conjugate of a corresponding data symbol in the processed block of symbols;
    processing pairs of said processed blocks of symbols for transmission on a first antenna on the N sub-carriers in a temporal first order; and
    processing pairs of said conjugated blocks of symbols for transmission on a second antenna on the N sub-carriers in the reverse temporal order.

2. The method according to claim 1, further comprising: defining blocks of symbols in one sequence of data symbols, wherein the pairs of processed blocks correspond to blocks of N symbols received sequentially.

3. The method according to claim 1, further comprising: processing a plurality of sequences of data, wherein to generate a corresponding plurality of blocks of symbols, each of said blocks of symbols including one symbol corresponding to each of the N sub-carriers.

4. The method as claimed in claim 1, wherein said processing each of said blocks of symbols comprises: changing the correspondence between the majority of the symbols in the block and their respective sub-carriers.

5. The method as claimed in claim 1, wherein said processing each of said blocks of symbols comprises: changing the correspondence between the all of the symbols in the block and their respective sub-carriers.

6. The method as claimed claim 1, wherein said processing each of said blocks of symbols comprises: interleaving the symbols in the block to change the respective correspondence with the N sub-carriers.

7. A receiver for receiving a sequence of data symbols transmitted over a wireless channel, comprising:
  a transmit diversity decoder configured to decode a signal processed for transmission in accordance with claim 1.

8. A mobile station for a wireless telecommunications network, comprising:
  the receiver as claimed in claim 7.

9. A method of processing at least one sequence of data symbols to be transmitted over a wireless channel, comprising:
  defining, in the at least one sequence of data symbols, a plurality of blocks of symbols;
  processing the at least one sequence of data symbols on a block-by-block basis to provide frequency diversity in the subsequently transmitted signal;
  processing the blocks of data in groups of two or more blocks to provide time diversity in the subsequently transmitted signal; and
  processing the blocks of data for transmission over at least two antennas to provide for spatial diversity in the subsequently transmitted signal,
  wherein said processing the at least one sequence of data symbols comprises:
  processing each of said blocks of symbols such that the correspondence between at least two of the symbols in the block and their respective sub-carriers are changed, to create a processed block in which each symbol corresponds to one of said sub-carriers,
  wherein said processing the blocks of data in groups of two or more blocks comprises:
  for each processed block of symbols, generating a corresponding conjugated block of symbols which includes N symbols that are the complex conjugate of a corresponding symbol in the processed block of symbols, and
  wherein said processing the blocks of data for transmission comprises:
  processing groups of said processed blocks of symbols for transmission on a first antenna on the N sub-carriers in a temporal first order; and
  processing equivalent groups of said conjugated blocks of symbols for transmission on a second antenna on the N sub-carriers in the different temporal order.

10. The method as claimed in claim 9, where the groups of processed blocks and conjugated blocks include two blocks.

11. A transmit diversity encoder configured to process at least one sequence of data symbols to be transmitted over a wireless channel including N sub-carriers having different frequencies, comprising:
  a block defining stage configured to define, in the at least one sequence of data symbols, a plurality of blocks of symbols;
  a frequency encoder configured to process the blocks of symbols to provide frequency diversity within the blocks of symbols;
  a space-time encoder configured to process the blocks of data in groups of two or more blocks to provide time diversity between blocks for transmission over different antennas,
  wherein the space-time encoder is configured to generate a conjugated block of symbols corresponding to each frequency encoded block of symbols, including N symbols that are the complex conjugate of a corresponding symbol in the frequency encoded block of symbols;
  and process pairs of said frequency encoded blocks for transmission on a first antenna in a temporal first order; and pairs of said conjugated blocks for transmission on a second antenna in the reverse temporal order.

12. The transmit diversity encoder as claimed in claim 11, wherein the frequency encoder is configured to interleave the symbols of a block in the frequency domain, to provide frequency diversity in the block.

13. A transmitter for a wireless communications network, comprising: at least two transmission antennas and the transmit diversity encoder as claimed in claim 11.

14. The transmitter according to claim 13, further comprises: at least one OFDM modulator for modulating data for transmission over a plurality of antennas.

15. A base station for a wireless communications network, comprising: the transmitter as claimed in claim 14.

* * * * *